US007720931B2

(12) United States Patent
Mei et al.

(10) Patent No.: US 7,720,931 B2
(45) Date of Patent: May 18, 2010

(54) SYSTEM AND METHOD OF REMOTELY MANAGING AND LOADING ARTIFACTS

(75) Inventors: Xiaochun Mei, Palo Alto, CA (US); Michael W. Brown, Austin, TX (US); Christopher S. Claussen, Austin, TX (US); Xin Huang, Beijing (CN); Hua Cheng, Beijing (CN); Gang Chen, Beijing (CN); Hai Y. Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 11/549,623

(22) Filed: Oct. 13, 2006

(65) Prior Publication Data

US 2008/0091792 A1 Apr. 17, 2008

(51) Int. Cl.
*G06F 15/16* (2006.01)

(52) U.S. Cl. .................. 709/217; 709/246; 709/219; 707/6; 707/104.1

(58) Field of Classification Search ............... 709/246, 709/217, 219; 707/6, 104.1
See application file for complete search history.

(56) References Cited

U.S. PATENT DOCUMENTS

| 5,586,323 | A | | 12/1996 | Koizumi et al. ............ 717/174 |
| 5,675,730 | A | * | 10/1997 | Perdue et al. ................. 714/38 |
| 5,680,605 | A | | 10/1997 | Torres |
| 5,768,578 | A | | 6/1998 | Kirk et al. |
| 5,774,668 | A | | 6/1998 | Choquier et al. |
| 6,023,586 | A | * | 2/2000 | Gaisford et al. ............ 717/178 |
| 6,042,614 | A | | 3/2000 | Davidson et al. ............ 717/116 |
| 6,163,859 | A | * | 12/2000 | Lee et al. ....................... 714/38 |
| 6,275,820 | B1 | | 8/2001 | Navin-Chandra et al. |
| 6,483,911 | B1 | * | 11/2002 | Capriotti ................ 379/201.03 |
| 6,553,421 | B1 | * | 4/2003 | Frick et al. .................. 709/227 |
| 6,601,236 | B1 | | 7/2003 | Curtis |
| 6,635,089 | B1 | * | 10/2003 | Burkett et al. ............... 715/235 |
| 6,637,020 | B1 | * | 10/2003 | Hammond .................. 717/107 |
| 6,640,238 | B1 | * | 10/2003 | Bowman-Amuah ......... 709/201 |
| 6,662,355 | B1 | | 12/2003 | Caswell et al. .............. 717/103 |
| 6,708,166 | B1 | * | 3/2004 | Dysart et al. .................... 707/6 |
| 6,742,015 | B1 | * | 5/2004 | Bowman-Amuah ......... 718/101 |
| 6,785,726 | B1 | | 8/2004 | Freeman et al. |
| 6,789,077 | B1 | | 9/2004 | Slaughter et al. ............. 707/10 |

(Continued)

OTHER PUBLICATIONS

"Babylon v2.0: middleware for distributed, parallel, and mobile Java applications", van Heiningen, et al. IEEE, 2006.

(Continued)

*Primary Examiner*—Joseph Thomas
*Assistant Examiner*—Anthony Fabbri
(74) *Attorney, Agent, or Firm*—Rabindranath Dutta; Konrad Raynes & Victor LLP (57) ABSTRACT

A system and method of remotely loading artifacts is disclosed. The method involves storing and indexing a plurality of artifacts in a centralized location. A query is received from a client to locate an artifact, and the artifact is located within the central location. A reply is then returned to the client, wherein the reply includes a location of the artifact. In one embodiment, the method of remotely loading artifacts further involves the artifacts being previously extracted from an application during the installation of the application.

26 Claims, 7 Drawing Sheets

U.S. PATENT DOCUMENTS

| | | | |
|---|---|---|---|
| 6,826,726 B2 | 11/2004 | Hsing et al. ................. 715/513 |
| 6,832,241 B2* | 12/2004 | Tracton et al. .............. 709/203 |
| 6,917,937 B1* | 7/2005 | Rubendall ...................... 707/5 |
| 6,934,740 B1* | 8/2005 | Lawande et al. ............ 709/213 |
| 6,947,063 B1* | 9/2005 | Cirulli et al. ................ 715/851 |
| 6,950,866 B1 | 9/2005 | Lowry et al. ................ 709/223 |
| 6,981,212 B1* | 12/2005 | Claussen et al. ............ 715/205 |
| 6,983,236 B1* | 1/2006 | Karlovac et al. ............. 703/22 |
| 7,047,518 B2 | 5/2006 | Little et al. ................. 717/108 |
| 7,069,547 B2 | 6/2006 | Glaser ........................ 717/154 |
| 7,146,355 B2 | 12/2006 | Chu-Carroll |
| 7,165,091 B2 | 1/2007 | Lunenfeld |
| 7,206,778 B2 | 4/2007 | Bode et al. |
| 7,210,010 B2* | 4/2007 | Ogle .......................... 711/162 |
| 7,225,180 B2 | 5/2007 | Donaldson et al. |
| 7,433,935 B1* | 10/2008 | Obert ......................... 709/219 |
| 2002/0010764 A1 | 1/2002 | Spicer |
| 2002/0078432 A1 | 6/2002 | Charisius et al. ............ 717/102 |
| 2003/0018950 A1* | 1/2003 | Sparks et al. ............... 717/100 |
| 2003/0033441 A1* | 2/2003 | Forin et al. ................. 709/315 |
| 2003/0084425 A1* | 5/2003 | Glaser ........................ 717/110 |
| 2003/0101434 A1* | 5/2003 | Szyperski ................... 717/120 |
| 2003/0233352 A1* | 12/2003 | Baker ........................... 707/3 |
| 2004/0003131 A1 | 1/2004 | Curtis |
| 2004/0177112 A1 | 9/2004 | Goodwin et al. |
| 2004/0187027 A1 | 9/2004 | Chan |
| 2004/0192280 A1* | 9/2004 | Dalton et al. ............... 455/418 |
| 2004/0248547 A1 | 12/2004 | Philsgard et al. |
| 2005/0044527 A1* | 2/2005 | Recinto ...................... 717/109 |
| 2005/0071806 A1* | 3/2005 | Sreedhar .................... 717/104 |
| 2005/0091055 A1* | 4/2005 | Shields ....................... 704/260 |
| 2005/0091655 A1* | 4/2005 | Probert et al. .............. 718/100 |
| 2005/0131971 A1* | 6/2005 | James et al. ................ 707/205 |
| 2005/0204367 A1 | 9/2005 | Minium, Jr. et al. |
| 2005/0289535 A1* | 12/2005 | Murray et al. .............. 717/172 |
| 2006/0031830 A1 | 2/2006 | Chu et al. |
| 2006/0036570 A1 | 2/2006 | Schaefer et al. |
| 2006/0055963 A1* | 3/2006 | Otsuka et al. ............. 358/1.15 |
| 2006/0101019 A1* | 5/2006 | Nelson et al. ................. 707/9 |
| 2006/0123412 A1 | 6/2006 | Hunt et al. |
| 2006/0136894 A1 | 6/2006 | Stallo et al. |
| 2006/0143247 A1* | 6/2006 | Poole et al. ................. 707/204 |
| 2006/0174190 A1* | 8/2006 | Gomes et al. ............... 715/511 |
| 2006/0200645 A1 | 9/2006 | Kumar |
| 2006/0212843 A1* | 9/2006 | Zaky et al. .................. 717/106 |
| 2006/0218623 A1 | 9/2006 | Hodges et al. |
| 2006/0230314 A1* | 10/2006 | Sanjar et al. .................. 714/26 |
| 2006/0265387 A1 | 11/2006 | Bhatkhande et al. |
| 2006/0277275 A1* | 12/2006 | Glaenzer .................... 709/219 |
| 2007/0113225 A1* | 5/2007 | Felts .......................... 717/172 |
| 2007/0124358 A1 | 5/2007 | Levi et al. |
| 2007/0143446 A1 | 6/2007 | Morris |
| 2007/0174237 A1* | 7/2007 | Wilbrink et al. ............... 707/3 |
| 2008/0091808 A1* | 4/2008 | Mei et al. ................... 709/223 |
| 2009/0062623 A1 | 3/2009 | Cohen et al. |

OTHER PUBLICATIONS

IBM Corporation, "Separating Work in a Repository-Based Team Environment for Software Development with Integrated Version Management Using a Working Copy for Every User", IBM Research Disclosure, May 2000, pp. 943-945.

IBM Corporation, "WebSphere Process Server V6.0.2; WebSphere Integration Developer V6.0.2 - Overview of New Functionality", Feb. 22, 2007, 20 pp.

Sundsted, T., "JNDI Overview, Part 1: An Introduction to Naming Services", [online], Jan. 1, 2000, [Retrieved on Aug. 2, 2007], retrieved from the Internet at <URL: http://www.javaworld.com/cgi-bin/mailto/x_java.cgi>, 4 pp.

Wikipedia, "Java Naming and Directory Interface", [online], modified Jul. 13, 2007, [Retrieved on Aug. 2, 2007], retrieved from the Internet at <URL: http://en/wikipedia.org/w/index.php?title=java_Naming_and_Directory...>, 2 pp.

* cited by examiner

FIG. 1

FIG. 2
Pre-Installation

SYSTEM AND METHOD OF REMOTELY MANAGING AND LOADING ARTIFACTS

BACKGROUND

1. Field

The present disclosure generally relates to a method, apparatus, and computer usable code for remotely loading and managing artifacts.

2. General Background

An artifact is data that an application requests for use in running or executing a process. This data may be, for example, an entry from a database, a text file, a table, a class, a dynamically linked library (DLL) file, a value, or a like object. Artifacts are often required to be shared between one or more applications.

Some typical solutions for sharing artifacts include sharing by copy, shared library, database-artifact registry models and passing artifacts with instance data.

A shared by copy approach involves copying the artifact into each application's scope. However, there are many drawbacks to such an approach. One drawback is that version control becomes hard. When the shared artifact needs to be changed, each of the applications which uses the artifact needs to be uninstalled and redeployed. Another drawback with the shared artifact approach is that implementing dynamicity is quite difficult. For example, in the case of a generic administrative application which manages other applications on a server, each time a new application with new artifacts is installed that the administrative application needs to manage, the administrative application must be stopped and even uninstalled. The new artifacts then must be copied to the administrative application. Further, the administrative application has to be redeployed. Finally, there is a lack of proper data isolation with the shared by copy approach. For example, consider application A has artifact A which defines "customer" using a first target namespace, and application B has artifact B which defines "customer" with a different field, but using the same target namespace. For the administrative application that manages both applications A and B, copying artifacts A and B to the administrative application will cause confusion as to which "customer" to use when an instance of "customer" needs to be created.

Another well known approach is using a shared library model. For example, a shared library can be created and common java classes and artifacts can be copied to this library. This shared library can be added to an application's classpath so that the application has access to those artifacts and java classes. This approach is an improvement over the shared by copy solution. However, it still has the same drawbacks related to implementing dynamicity and data isolation as discussed above. For example, in the case of the dynamicity issue, when new artifacts are defined or created in new applications, the shared library needs to be re-deployed. In the case of data isolation, since multiple applications can see/load everything in their shared library, the issue still exists in this approach. If artifact A and artifact B define the same target namespace and type (such as "customer"), placing artifacts A and B directly into the same shared library will cause a conflict to arise. Another major drawback of this approach is the lack of remote loading. Since a shared library is local to a server or cluster, a shared library could not be used by servers on different clusters, let alone servers on different cells.

A variation of the shared library approach is using a database to store artifacts. The database in this approach is sometimes called an artifact registry. Although this approach solves the remote access/loading issue—any server/application has access to the database or artifact registry could use artifacts, this approach still does not resolve the dynamicity issue. It does not define how an application behaves when it can access conflict artifacts. Second, this approach requires database access. In Java 2 Platform Enterprise Edition (J2EE) and Java 2 Platform Standard Edition (J2SE), integrating an application with a central database is not an easy task, as it requires extensive Java Database Connectivity (JDBC) or J2EE entity bean design and programming.

Another solution has been to pass artifacts, which can include meta-data, along with instance data. This way, when a client receives instance data, it can use the attached artifact to interpret the instance data. One example of this is a scenario supported by Microsoft .Net. In this scenario, a Web Service Definition Language ("WSDL") response generated by .Net contains a response, e.g., an instance data, along with meta-data. For example, the meta-data may be in Extensible Markup Language ("XML"), or more specifically an XML Schema Definition ("XSD") schema. .Net expects the service caller interprets response using the attached XSD schema. The biggest problem of this approach is performance. Meta-data only needs once, after it is loaded in memory, the consequent creating instance data shall be supported. By always passing schema with instance data, the same meta-data will need to be loaded again and again for handling subsequent instance data. The second issue of this solution is that it is artifact types specific and protocol specific. The .Net approach only provides a solution for XSD schema passed using web services.

SUMMARY

In one aspect of the disclosure, a computer program product comprises a computer useable medium having a computer readable program. The computer readable program when executed on a computer causes the computer to store a plurality of artifacts in a centralized location. Each of the plurality of artifacts were previously extracted from an application during the installation of the application. The plurality of artifacts are further indexed. The computer readable program when executed on a computer further causes the computer to receive a query from a client to locate an artifact. The computer readable program when executed on a computer also causes the computer to locate the artifact within the central location based on criteria specified in the query. The computer readable program when executed on a computer finally causes the computer to transmit a location of the artifact to the client.

In yet another aspect of the disclosure, the computer readable program can be implemented as a method. Accordingly, the method can perform the functionality of the computer readable program without a computer program product.

In another aspect of the disclosure, a system is disclosed. The system has a communication module configured to receive a query for an artifact and return a location of the artifact matching criteria specified in the query. The system further has a centralized storage associated with the communication module, the centralized storage having a plurality of artifacts stored therein, each of the plurality of artifacts having been previously extracted from an application during installation of the application, the artifacts further being indexed. The system also includes a locator module for searching the centralized storage and identifying the artifact matching criteria specified in the query, the locator module further configured to return the location of the artifact to the communication module.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

An artifact is data used by an application in order to run or execute a process. This data may be, for example, an entry from a database, a text file, an XML file, a table, a class, a dynamic link library file, a value, or some other object.

As XML becomes popular, more and more modern applications are using artifacts defined in an XML file. There are two main categories of XML files. One defines meta-data, e.g. xsd schema, and another contains instance data. XML schema files express shared vocabularies and provide a means for defining the structure, content and semantics of XML documents. XML schema is one example of an artifact, or data needed by an application to run. Applications use artifacts to define meta-data, and based on meta-data, to create an instance, e.g. XML file or Java object.

An artifact can be identified by a Target NameSpace (TNS). In general, a namespace is an abstract container providing context for the items, such as artifacts, it holds and allows disambiguation of items having the same name (residing in different namespaces). For example, as a rule, names in a namespace cannot have more than one meaning, that is, two or more things cannot share the same name. A namespace is also called a context, as the valid meaning of a name can change depending on what namespace applies.

Therefore, the target namespace is only guaranteed to be unique within the universe that it is created or contained. Most often, such a universe is an application. However, in a distributed computing environment where multiple applications need to communicate with each other, and each of the applications may be located in different servers, or even on different networks, issues may arise.

In some cases, applications have totally different artifacts that use the same target namespace. This makes sharing and maintaining artifacts difficult. In modern software, applications hardly only work independently. Very often data is exchanged between applications. To interpret, validate, or transform the data among different applications, the meta-data needs to be shared by the involved applications. This brings up a problem of how to share artifacts.

The present disclosure provides for a method, apparatus, and computer readable medium of remotely managing and loading artifacts. In one aspect, a method for managing artifacts involves monitoring application installation events on a server and intercepting an application installation event when detected. Any artifacts found within the application are extracted and stored in a centralized location. The artifacts are indexed based on the target namespace. A service is provided for receiving queries to locate an artifact and returning the location of the requested artifact to the requestor.

In another aspect, a method for remotely loading artifacts is disclosed. The method involves storing and indexing a plurality of artifacts in a central location. A query is received from a client to locate an artifact, and the artifact is located within the central location. A reply is then returned to the client, wherein the reply includes an address to the artifact. In one embodiment, the method of remotely loading artifacts further involves artifacts are previously extracted from an application during the installation of the application.

Figure 1:
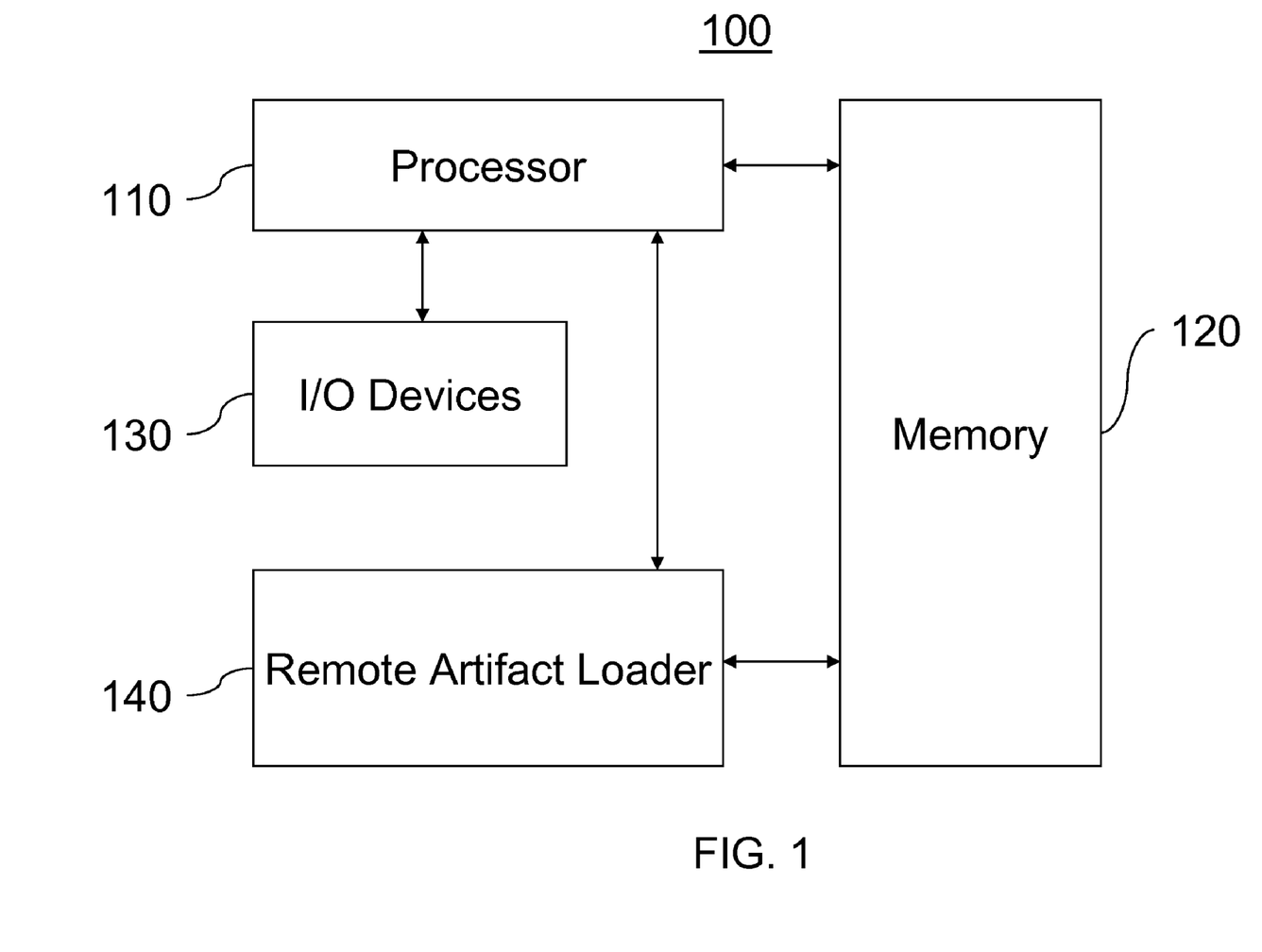
FIG. 1 illustrates a block diagram of a system 100 that incorporates a remote artifact loading module.

FIG. 1 is an exemplary block diagram of a system 100 in which a remote artifact loader in accordance with the present disclosure may be implemented. In one embodiment, the station or system 100 is implemented using a general purpose computer or any other hardware equivalents. Thus, the station or system 100 comprises a processor (CPU) 110, a memory 120, e.g., random access memory (RAM) and/or read only memory (ROM), remote artifact loader module 140, and various input/output devices 130, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the remote artifact loader 140 can be implemented as one or more physical devices that are coupled to the CPU 110 through a communication channel. Alternatively, the remote artifact loader 140 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the remote artifact loader 140 (including associated data structures) of the present invention can be stored on a computer readable medium, e.g., RAM memory, magnetic or optical drive or diskette and the like.

Figure 2:
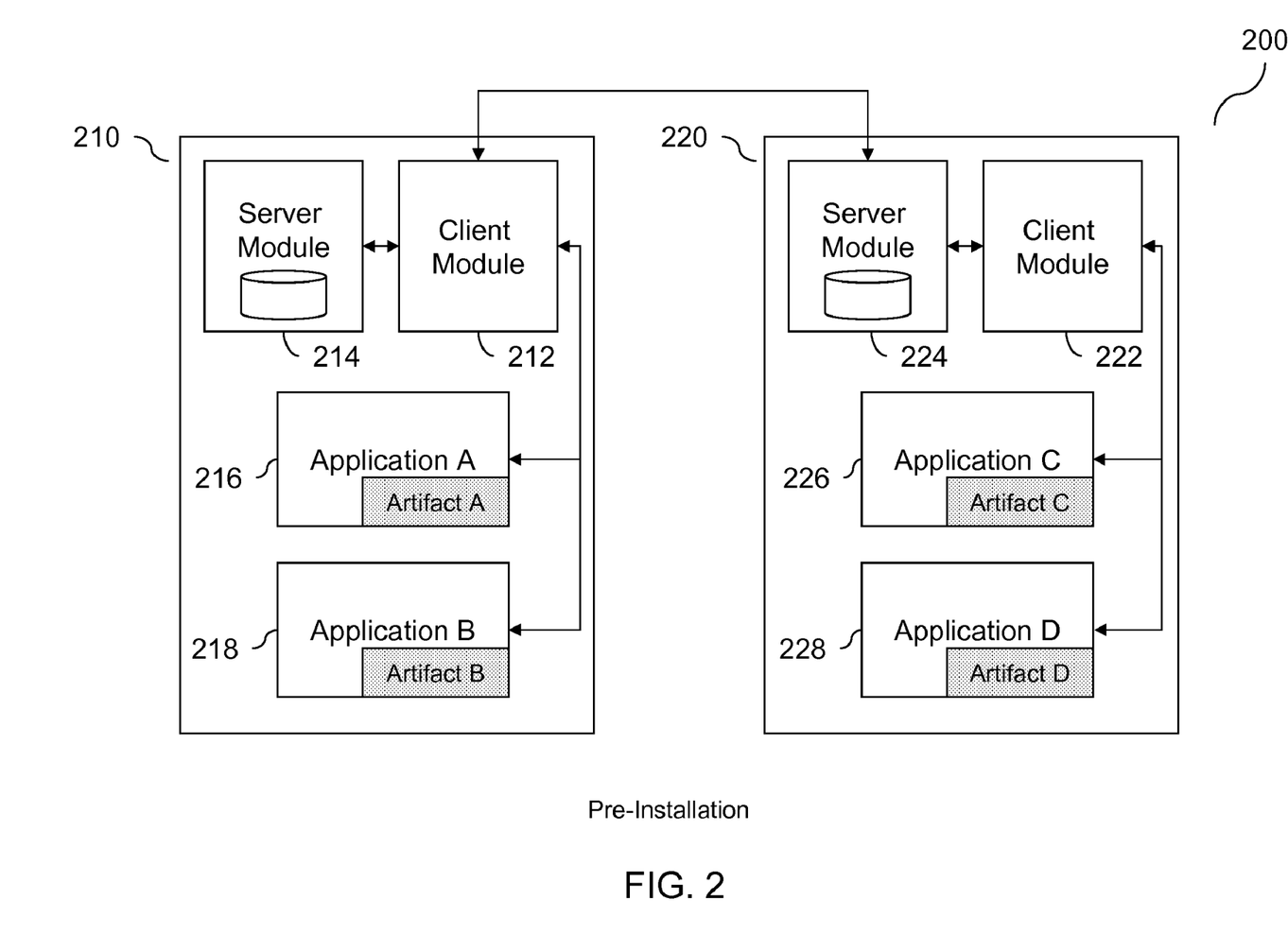
FIG. 2 is a block diagram of a pre-installation system in which the remote artifact loader (RAL) in accordance with the present disclosure may be implemented.
Figure 3:
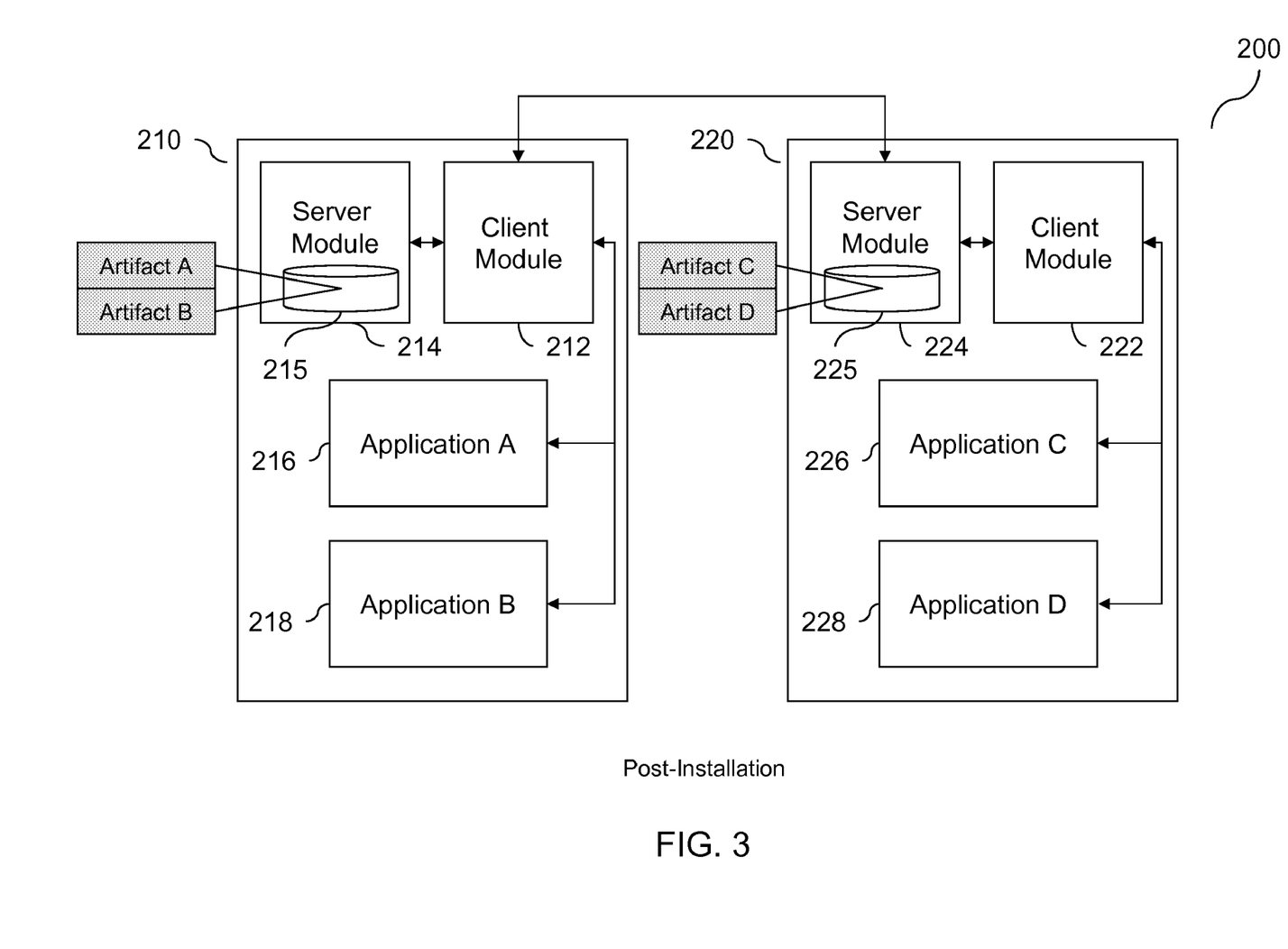
FIG. 3 is a block diagram of a post-installation system in which the remote artifact loader (RAL) in accordance with the present disclosure may be implemented.

FIGS. 2 and 3 are block diagrams of a system in which the Remote Artifact Loader (RAL) in accordance with the present disclosure may be implemented.

In one aspect, the system is implemented within a communications network. The communications network includes connections, such as wire, wireless communication links, or fiber optic cables. For example, one or more systems 100 as may be operably connected via a communications network. For exemplary purposes, two computers or servers 210 and 220 are shown in FIG. 2. Servers 210 and 220 are on a network and able to communicate with each other. Servers 210 and 220 may be application servers, which host one or more applications which operate thereon. Servers 210 and 220 may also provide other data and services, such as boot files, operating system images to clients or other servers within the communication network. As can be seen from FIG. 2, server 210 hosts Application A and Application B, and server 220 hosts Application C and Application D. Furthermore, Applications A and B on server 210 may communicate with Applications C and D on server 220.

Each of Applications A, B, C, and D require Artifacts A, B, C and D, respectively, to run. However, Applications A and B may also need to access or share Artifacts C and D.

In these examples, an artifact is data needed by an application requesting the data to run or execute a process. This data may be, for example, a table, a class, a dynamic link library file, a value, or some other object. In one example, the data may be meta-data, and in the case of XML, the data may be XSD schema.

In one aspect, the remote artifact loader comprises two distinct modules—a remote artifact loader client module (RAL client module) and a remote artifact loader server module (RAL server module). In general, the RAL client module is responsible for formulating queries in response to requests for artifacts from applications, and the RAL server module collects and hosts artifacts, and responds to queries from the RAL client module. An RAL client module and an RAL server module are preferably installed on each of the application servers 210 and 220. In one aspect, the RAL server module manages artifacts within a system by extracting artifacts when an application is installed, and storing the artifacts in a centralized location so that they can be accessed by applications. The RAL server module monitors the application server environment for any application installation events. When the artifact loader server module detects an application is to be installed, the artifact loader server module searches the associated application files to locate any artifacts. Any artifacts found are extracted by the artifact loader server module and stored in a central location. In one embodiment, the artifacts are indexed, for example, by target namespace, application, and type of artifact.

For example, RAL server module 214 which resides on application server 210 is configured to constantly monitor any application installation events on application server 210. RAL server module 214 detects the installation of Application A. RAL server module searches the application installation files for any artifacts associated with the Application A. In this example, Artifact A is associated with Application A as is shown in FIG. 2. Artifact A is therefore extracted and stored in central location 215 by RAL server module. FIG. 3 illustrates Artifact A being stored in a central location 215. Similarly, RAL server module 214 detects the installation of Application B. RAL server module searches application installation files of Application B for any artifacts associated with the application. Any artifacts found within Application B are extracted by the RAL server module and stored in a central location. Artifacts associated with Applications A and B are now stored in a central location 215 accessible by RAL server module. The artifacts are preferable indexed, so that they may be easily located at a later time.

FIG. 2 illustrates Artifacts A, B, C, and D prior to installation and detection by the RAL server module of Applications, A, B, C, and D, respectively. The artifacts are located within the installation files for each application. FIG. 3 illustrates Artifacts A, B, C & D after installation of Applications A, B, C, and D, respectively. At this point, the artifacts are no longer located within each individual application. The artifacts are now stored in a central location such as a file, a database, etc.

In one embodiment, each RAL server module hosts artifacts local to its own environment. For example, RAL server module 214 hosts artifacts from server 210, or Artifacts A and B. Similarly, RAL server module 224 hosts artifacts from Applications on server 220, or Artifacts C and D. In other embodiments, a single RAL server module may be configured to host artifacts from applications installed on more than one server.

The present disclosure allows for artifacts to be defined, created, and maintained in an application centric view. Artifacts are deployed with an individual application, but are collected by a remote artifact loader service and stored in a central location, where they may be accessed by a plurality of applications at a later time.

In another aspect, the RAL server module further acts as the search engine for locating artifacts in response to requests for artifacts by applications. The RAL client module communicates with applications and queries the RAL server module in order to locate artifacts needed by the applications. In one embodiment, the RAL client module communicates only with applications on the same application server. For example, RAL client module 212 communicates with applications A and B. Similarly, RAL client module 222 communicates with Applications C and D.

In one example, RAL client module 212 may receive a request from Application A for an artifact. In one embodiment, RAL client module 212 queries its own local RAL server module 214 for the artifact associated with Application A. RAL server module returns the location of the Artifact A to the RAL client module, which in turn returns a response to the Application A.

However, an application may share an artifact from an application on another server. Therefore, in another embodiment, RAL client module queries a remote RAL server module for an artifact. Referring to FIG. 3, assuming there are two application servers, server 210 and 220. In application server 210, Application A is configured to use artifacts in Application C located on remote application server 220. Application C uses Artifact C, which was previously extracted, and now resides in a central location, managed by RAL server module 224. Application A therefore sends a request to RAL client module 212. RAL client module 212 then queries RAL server module 224, which is running on application server 220. RAL server module 224 will return the URL of Artifact C. Application A then loads Artifact C from the URL using http protocol. It may be noted that when a thread loads artifacts from different remote applications, a new classloader is created in order to isolate conflict artifacts.

Example criteria found in a query include namespace, application identifier, and type. Namespace essentially defines the scope of a name or a symbol—that potion of a program or collection of classes in which the name or symbol has meaning. Distinct namespaces protect variable and method names from conflicts, which are also called name collusions. A type is data describing the types of data that may be present. A type may be, for example, XML schema complex type, XML schema simple type, and XML element type. A type also may be, for example, a file extension of MIME type. An application identifier such a the application name may be included as criteria in a query. For example, the application requesting the artifact, or the application from which the artifact is requested to be shared may be included in the query.

Figure 4:
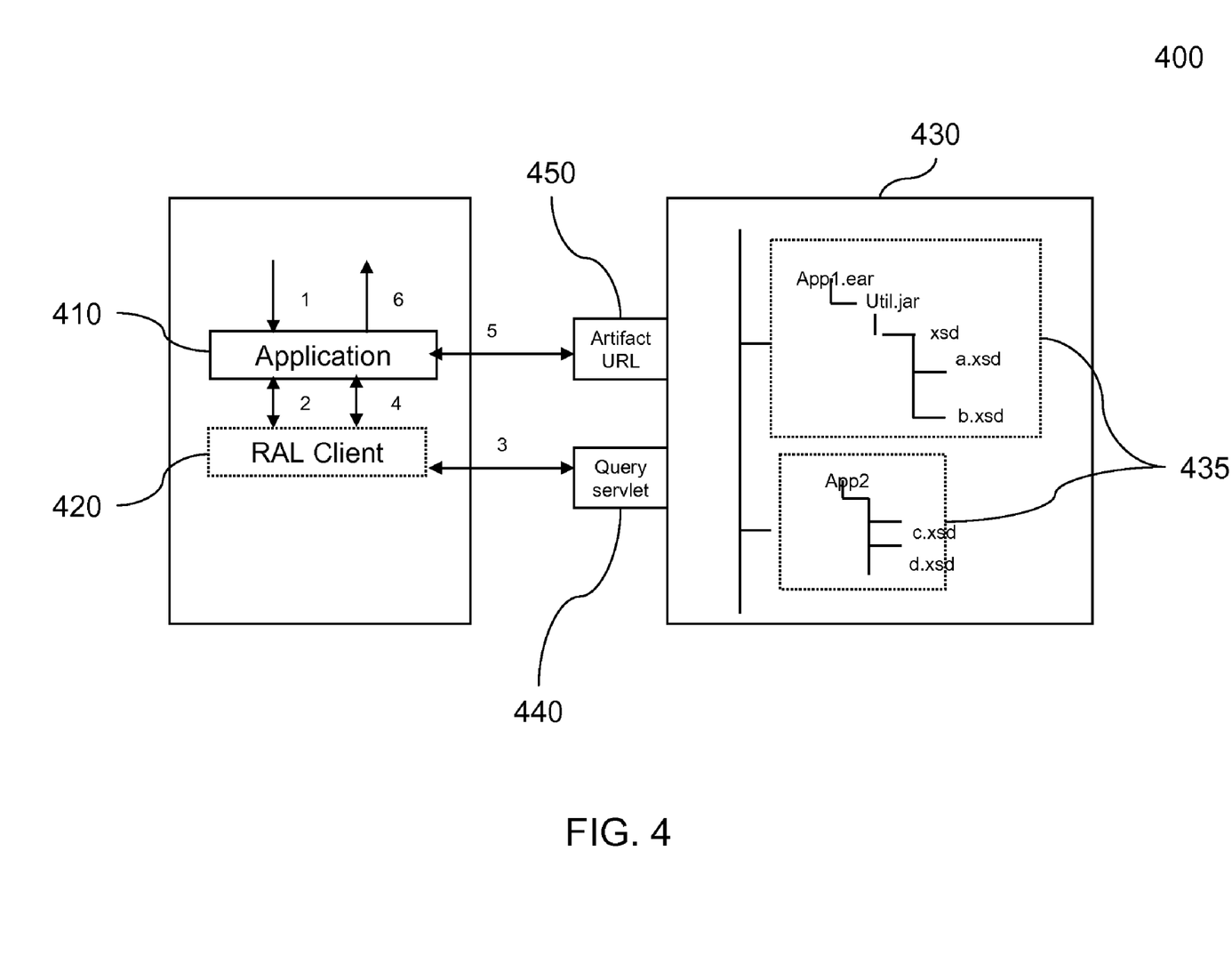
FIG. 4 is a diagram illustrating the communication between the remote artifact loader client module and server module in accordance with an illustrative embodiment of the present invention.

FIG. 4 illustrates in more detail an exemplary embodiment of the communication that occurs between the RAL server module, RAL client module, and the requesting application. In this example, RAL server module 430 has already extracted artifacts 435 from two applications; application 1 and application 2. Artifacts 435 are stored within a central location and easily accessible by the RAL server module 430.

Artifacts a.xsd and b.xsd were extracted from Application 1, while artifacts c.xsd and d.xsd were extracted from Application 2. In one aspect, the RAL server module 430 has two functions. First, RAL server module serves querying requests from RAL client 420. In one embodiment, this is accomplished through query servlet 440. When application 410 needs to create instance data for an artifact (let's assume a.xsd), it queries RAL client module 420. RAL client module 420 passes the query on to RAL server module 430 through query servlet 440. RAL server module 430 searches the central location where artifacts are stored and identifies artifact a.xsd. RAL server module then returns the location of artifact a.xsd back to RAL client module 420. In an exemplary embodiment, the location of the artifact is a URL 450. RAL client module then relays the location of the artifact (or URL) back to application 410. Upon receiving a.xsd's location, the application 410 needs to load this artifact into memory in order to create its instance. At this step, the RAL client module 430 is out of loop of process. Application 410 loads artifact A 435 directly from RAL server module 430 using the server module's second functionality, which is hosting artifacts. In this implementation, a web model is used, and artifacts are hosted using HTTP protocol. As an example, the URL may take the following form: http://server:9080/ral/AppC.ear/util.jar/xsd/C.xsd While the address or location of artifacts may most simply be represented as a URL, any other form of address may be used. The address may take other forms such as memory address or a path, depending on the particular environment and implementation.

Therefore, queries for artifacts are handled by the RAL client module. If an artifact needs to be loaded from a remote application, the RAL client module is responsible to locate the remote RAL server module and query RAL server module for the location of artifacts.

The remote artifact loader can be configured in a number of ways. Configuration is generally set at the application level. The configuration determines which RAL servers (local or remote) are queried, and in what order.

In one embodiment, a static configuration is utilized. In a static configuration, the RAL client module automatically queries the local RAL server module first. If the artifact matching the namespace cannot be located by the local RAL server module, the RAL client module may be configured to query a remote RAL server module.

For example, consider Application 2 is configured to load artifacts from Application 1. The following artifacts are present.

| Artifact | Locates | Namespace | Type |
| --- | --- | --- | --- |
| C | Locates locally | defines tns1 | Customer |
| D | Locates locally | defines tns2 | Employee |
| E | Locates remotely | Defines tns1 | Customer |
| F | Locates remotely | Defines tns3 | Manager |

A query for an artifact matching target namespace 1 (tns1) would result in artifact C be returned since it is in local application and defines tns1. A query for an artifact matching target namespace 2 (tns2) will return d.xsd since it is in local application and defines tns2.

However, a query for an artifact matching target namespace 3 (tns3) will return f.xsd because there is no artifact defines tns3 locally. It should furthermore be noted that in this example, Artifact e.xsd will not be used since its target namespace is already defined by a local artifact c.xsd.

In another embodiment, the RAL client module may be configured in a dynamic configuration. In a dynamic configuration, the scoping works in an opposite manner to that of the static RAL client configuration. After a RAL client is created dynamically, the remote RAL server module will be searched first for artifacts, and if the remote RAL server module does not define an artifact with the namespace that is being queried, the local RAL server module will be queried.

In the case of a dynamically created RAL client, a new classloader is created. The current thread's context classloader will be set as the parent classloader of this newly created classloader. The new classloader will be set to the thread's context classloader. This new classloader will be removed only when it is being unset. At unset, the thread's original context classloader will be restored.

The reason for creating a new classloader for each dynamically created RAL client module is for data isolation. For example, assuming a RAL client module is created dynamically. A new classloader 1 is created and associated with this new RAL client module that points to remote app1.ear. Assuming app1.ear has an utility.jar that contains c.xsd and c.xsd defines tns1, the following query will receive the address to artifact c.xsd in return:

ArtifactLoader.INSTANCE.queryURLs("xsd","tns1", null);

Now, a user calls unset( ) api to cleanup the remote AL, after that he/she created a new dynamic RAL client module. A new classloader 2 is created and associated with this new RAL client module that points to remote app2.ear. Assuming app2.ear has a utility.jar that contains an artifact e.xsd and e.xsd defines tns1, the following query will receive the address to artifact e.xsd in return:

ArtifactLoader.INSTANCE.queryURLs("xsd","tns1", null);

The above scenario is perfectly fine since this design covers data isolation. Artifact c.xsd is only visible to dynamic classloader 1 and artifact e.xsd is visible only to dynamic classloader 2.

The remote artifact loader configuration can be set through following several options. In one embodiment, the configuration can be set completely through administration such as through an administrative console. The RAL is transparent to the application.

In another embodiment, configuration can also be set programmatically. In this option, internal components can use a programming model to dynamically create one or multiple RAL configurations. In yet another embodiment, the configuration may be set programmatically by creating a configuration template. For example, the RAL client can be configured programmatically to load artifacts from multiple remote applications The remote artifact loader can be configured at the application, server, cluster and cell level.

Figure 5:
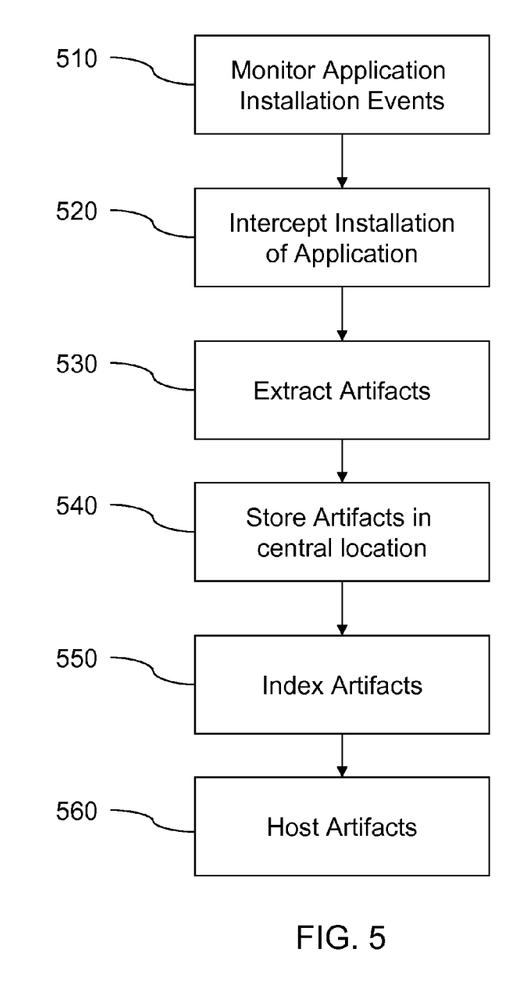
FIG. 5 is a block flow diagram illustrating an exemplary method of managing artifacts in accordance with the present disclosure.

FIG. 5 is a block flow diagram illustrating the steps performed in an exemplary method of managing artifacts.

An RAL server module is configured to monitor application installation events within a specific environment, such as an application server. Once an application installation event is detected, installation is intercepted, as shown at block 520. The application to be installed is searched and analyzed for any artifacts present. Any artifacts associated with the application are extracted, as is indicated at block 530. The RAL then stores the extracted artifacts in a central location, as shown at block 540, so that they may be accessed at a later time by the application or any other requesting applications. The artifacts are preferably indexed at block 550. The RAL server module finally hosts the artifacts, as indicated at block

560, by accepting queries for artifacts from requesting applications, locating artifacts, and responding with the appropriate address indicating the location of the artifact.

Figure 6:
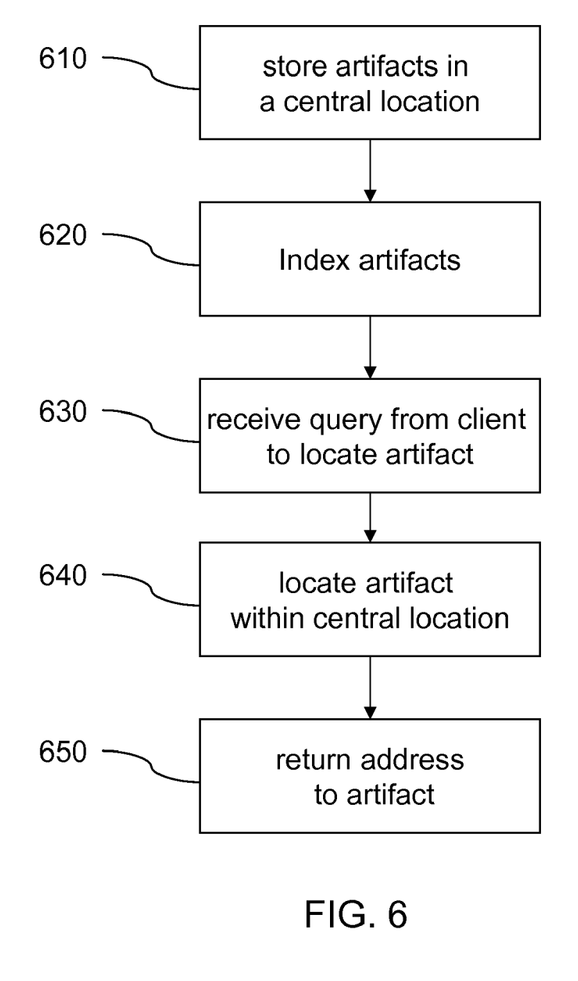
FIG. 6 is a block flow diagram illustrating the steps performed by a remote artifact server module in accordance with the present disclosure.

FIG. 6 is a block flow diagram which illustrates the process performed by an exemplary remote artifact server module in accordance with the present disclosure.

The RAL server module first stores a plurality of artifacts in a central location as indicated at block 610. The central location may be a database, a directory structure, etc. The RAL server module preferably indexes the artifacts, so that they may be easily located by requesting applications. In one embodiment, each artifact is at least indexed according to target namespace. Artifacts may also be indexed according to other criteria, such as application, and data type. Indexing artifacts is indicated at block 620. As shown at block 630, the RAL server module accepts a query for an artifact from an RAL client module. In response to such a query, the RAL server module searches the central location where artifacts are stored for a matching artifact. The query for example contains criteria, such as target namespace, or requesting or target application. Once a matching artifact is located, the RAL server module returns the address of the artifact to the RAL client module, as indicated at block 650. In one embodiment, the address is simply a URL.

Figure 7:
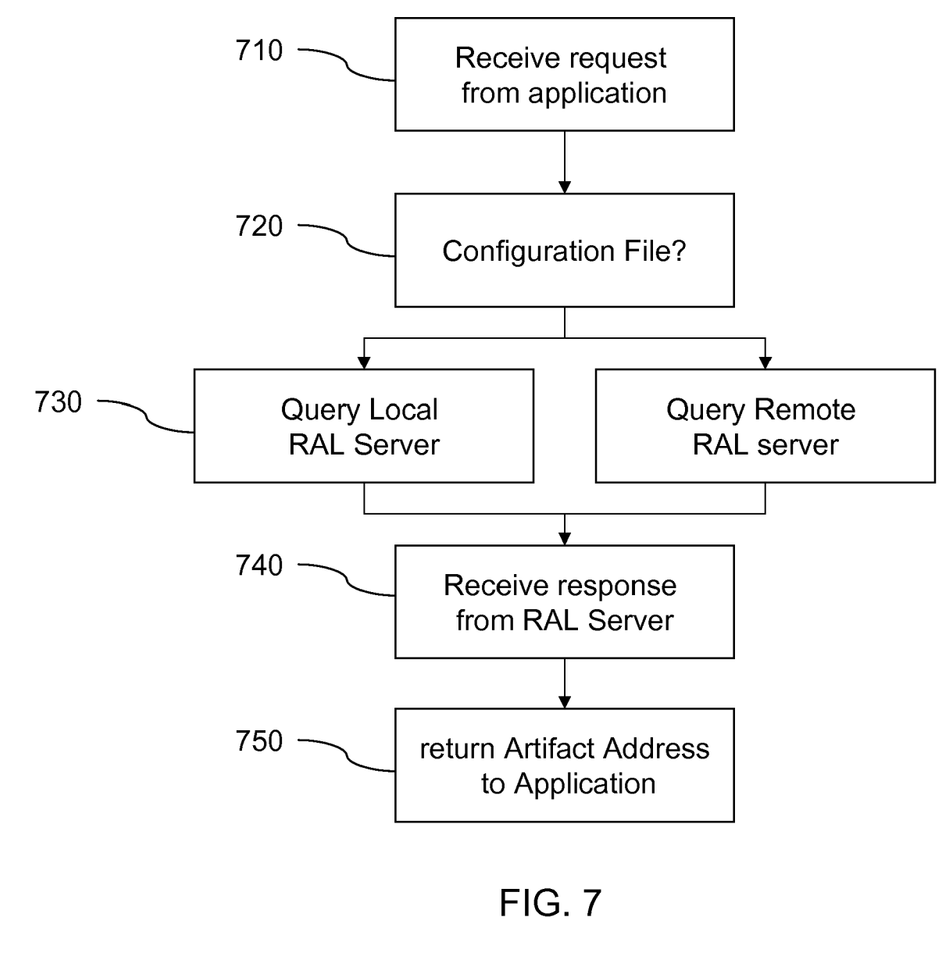
FIG. 7 is a block flow diagram illustrating the steps performed by a remote artifact loader client module in accordance with the present disclosure.

FIG. 7 is a block flow diagram illustrating the steps performed by a remote artifact loader client module in accordance with one embodiment of the present disclosure.

At block 710, the RAL client module receives a request from an application for an artifact. Depending on the configuration, the RAL client proceeds to query an RAL server module. The RAL server module may be on the local machine, or on a remote machine. In on aspect, a local RAL server is queried first. If there is no artifact matching the requested target namespace, a secondary remote RAL server may be queried. Alternatively, in another aspect, a remote RAL server is queried first, and the local RAL server module is only queried if there is no artifact matching the target namespace on the remote RAL server. Once the RAL server module locates the matching artifact, it sends a response to the requesting RAL client module, as indicated at block 740. Finally, the RAL client module forwards the address, or URL of the artifact to the requesting application, as shown at block 750.

Remote Artifact Loader provides a mechanism for remotely loading artifacts, such as XSD files. Without this feature, it is very difficult to run a remote client against a server providing web services. After a new application is deployed, the artifacts such as XML schemas have to be exported and physically copied to the remote client machine. This procedure is complex and error-prone. When the application's artifacts get updated, the remote client also needs to be updated with the same artifacts.

There are several advantages to the remote artifact loader of the present disclosure. First, artifacts are collected and indexed from applications automatically. Second, the query application programming interface (API) is decoupled from whether artifacts are local or remote. Using a simple protocol such as Hypertext Transfer Protocol (HTTP) to host remote artifacts resolves several previous issues.

Finally, the remote artifact loader allows any application to load artifacts from any other application, no matter where they are.

The remote artifact loader of the present application makes version control easy. Artifacts are still defined and maintained by the original application. As long as the original application updates its artifacts, all the other applications that share those artifacts will be updated automatically.

The remote artifact loader furthermore makes implementing dynamicity easier. Administrative or generic applications that receives instance data from other applications no longer needs to copy those artifacts. Even a new application is added, as long as an administrative or generic application knows which application the instance data comes from, it can load artifacts from new application.

The remote artifact loader of the present disclosure defines a proper data isolation solution where conflicting artifacts in different applications can be used.

The remote artifact loader in accordance with the present disclosure also addresses performance issues with prior art methods which involved passing artifacts with instance data.

Thus, the present disclosure provides a method, apparatus, and computer usable code for remotely managing and locating artifacts. This is a generic solution for remote artifact loading, not specific for a particular artifact (not specific for XSD schema). The method and apparatus can take the form of an entirely hardware embodiment, an entirely software embodiment or an embodiment containing both hardware and software elements. In a preferred embodiment, the remote artifact loader is implemented in software, which includes but is not limited to firmware, resident software, microcode, etc.

Furthermore, the remote artifact loader can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer program product comprising a computer useable medium having a computer readable program, wherein the computer readable program when executed on a computer causes the computer to:

store a plurality of artifacts in a centralized location, each artifact having been previously extracted from an application during the installation of the application, wherein to execute a process the application requests an artifact for execution;

share the plurality of artifacts among a plurality of applications having different artifacts that use an identical target namespace, the plurality of artifacts further being indexed;

receive a query from a client to locate the artifact, wherein a criteria that includes a target namespace and one application is specified in the query;

search the centralized location for a matching artifact in response to receiving the query, wherein the target namespace is an abstract container that provides a context for any artifact that the abstract container holds, wherein the target namespace is unique within the application in which the target namespace is created;

locate the matching artifact within the centralized location based on the criteria specified in the query; and transmit a location of the matching artifact to the client, wherein a remote server module is searched first for the artifact, and wherein if the remote server module does not define the artifact that includes the target namespace specified in the query, a local server module is queried.

2. The computer program product of claim 1, wherein the artifact includes metadata, and wherein a client module corresponding to the client is configured in a dynamic configuration.

3. The computer program product of claim 1, wherein the artifact includes an Extensible Markup Language schema.

4. The computer program product of claim 1, wherein the plurality of artifacts are further indexed according to at least one of the target namespace, application identifier and type.

5. The computer program product of claim 1, wherein artifacts are extracted from a tree structure and stored in a flat file structure.

6. The computer program product of claim 1, wherein the location of the artifact is identified with a Uniform Resource Locator.

7. The computer program product of claim 1 wherein the centralized location is a database.

8. The computer program product of claim 1 wherein the centralized location is a directory structure.

9. A method comprising:

storing a plurality of artifacts in a centralized location, each artifact having been previously extracted from an application during the installation of the application, wherein to execute a process the application requests an artifact for execution;

sharing the plurality of artifacts among a plurality of applications having different artifacts that use an identical target namespace, the plurality of artifacts further being indexed;

receiving a query from a client to locate the artifact, wherein a criteria that includes a target namespace and one application is specified in the query;

searching the centralized location for a matching artifact in response to receiving the query, wherein the target namespace is an abstract container that provides a context for any artifact that the abstract container holds, wherein the target namespace is unique within the application in which the target namespace is created;

locating the matching artifact within the centralized location based on the criteria specified in the query; and returning a location of the matching artifact to the client, wherein a remote server module is searched first for the artifact, and wherein if the remote server module does not define the artifact that includes the target namespace specified in the query, a local server module is queried.

10. The method of claim 9 wherein the artifact includes metadata, and wherein a client module corresponding to the client is configured in a dynamic configuration.

11. The method of claim 9 wherein the artifact includes Extensible Markup Language schema.

12. The method of claim 9 wherein the artifacts are indexed according to the target namespace.

13. The method of claim 12 wherein the artifacts are further indexed according to application.

14. The method of claim 12 wherein artifacts are further indexed according to type.

15. The method of claim 9 wherein artifacts are extracted from a tree structure and stored in a flat file structure.

16. The method of claim 9 wherein the location of the artifact is a Uniform Resource Locator.

17. The method of claim 9 wherein the centralized location is a directory structure.

18. The method of claim 9 wherein the client is in communication with the application.

19. The method of claim 9, wherein the query includes at least one of a target namespace, application identifier, and type.

20. A system comprising:

a communication module configured to receive a query for an artifact and return a location of the artifact matching criteria specified in the query, wherein the criteria specified in the query includes a target namespace and one application;

a centralized storage associated with the communication module, the centralized storage having a plurality of artifacts stored therein, each of the plurality of artifacts having been previously extracted from an application during installation of the application, wherein to execute a process the application requests the artifact for execution and wherein the system is configured to:

share the plurality of artifacts among a plurality of applications having different artifacts that use an identical target namespace, the plurality of artifacts further being indexed;

receive a query from a client to locate the artifact, wherein a criteria that includes a target namespace and one application is specified in the query; and search the centralized storage for a matching artifact in response to receiving the query, wherein the target namespace is an abstract container that provides a context for any artifact that the abstract container holds, wherein the target namespace is unique within the application in which the target namespace is created;

a locator module for searching the centralized storage and identifying the artifact matching criteria specified in the query, the locator module further configured to return the location of the matching artifact to the communication module; and a remote server module and a local server module, wherein the remote server module is searched first for the matching artifact, and wherein if the remote server module does not define the artifact that includes the target namespace specified in the query, the local server module is queried.

21. The system of claim 20 further comprising a client module, the client module being in communication with an application requesting an artifact, and configured to send a query for the artifact to the communication module.

22. The system of claim 21 wherein the client module is configured by an administrator to query a specific communication module and associated centralized storage.

23. The system of claim 21 wherein the client module is configured to programmatically query one or more specific communication modules and each associated centralized storage.

24. The system of claim 20 wherein the artifact includes metadata, and wherein a client module corresponding to the client is configured in a dynamic configuration.

25. The system of claim 20 wherein the artifact includes Extensible Markup Language schema.

26. The system of claim 20 wherein the artifacts are further indexed according to at least one of an application name and type.

* * * * *